Dec. 4, 1951     T. S. SAAD     2,577,543
POWER MEASURING SYSTEM
Filed Jan. 17, 1946
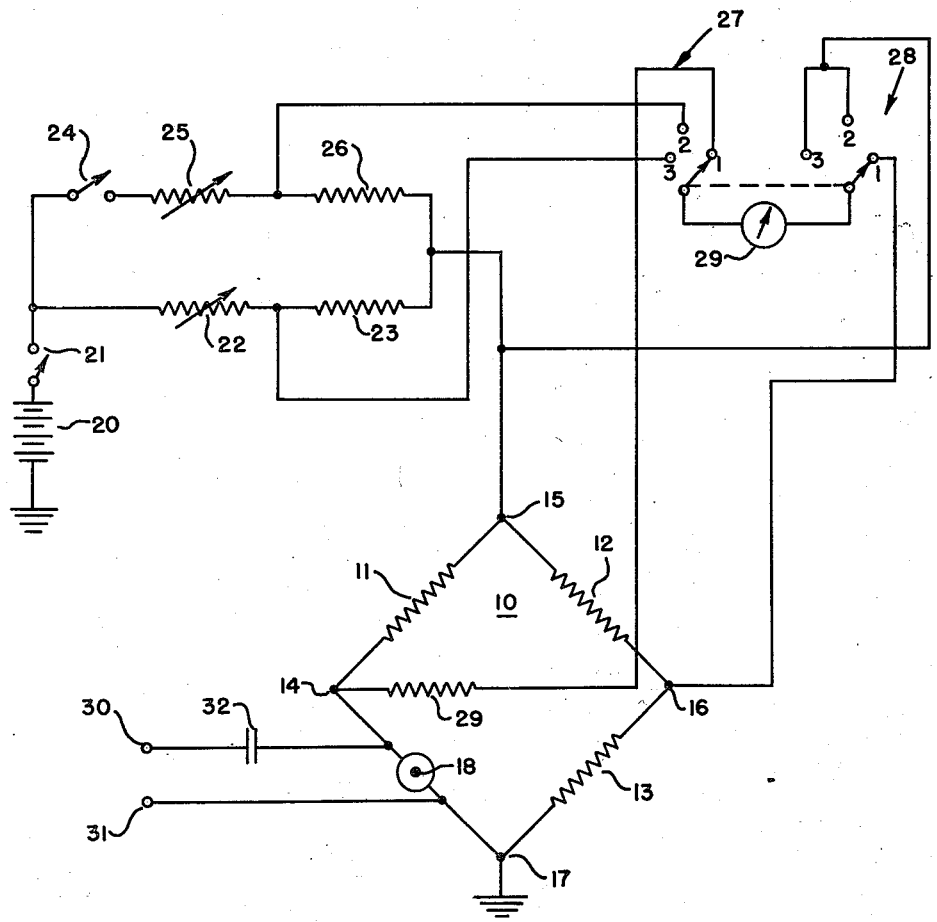
INVENTOR.
THEODORE S. SAAD
BY
*William D. Hall.*
ATTORNEY Patented Dec. 4, 1951

2,577,543

UNITED STATES PATENT OFFICE 2,577,543

POWER MEASURING SYSTEM

Theodore S. Saad, West Roxbury, Mass., assignor, by mesne assignments, to the United States of America as represented by the Secretary of War Application January 17, 1946, Serial No. 641,832

2 Claims. (Cl. 171—95)

This invention relates generally to an electrical circuit and more particularly to a thermistor bridge-type network for measuring radio frequency power.

It is an object of this invention to provide a thermistor bead type bridge for measuring radio frequency power which is simple, compact and portable. Another object is to provide means which will enable the bridge to be self-calibrating.

Other objects, features and advantages of this invention will suggest themselves to those skilled in the art and will become apparent when taken in connection with the accompanying circuit diagram which illustrates an arrangement embodying the principles of this invention.

Referring to the figure, there is shown a bridge network 10 consisting of three fixed resistors 11, 12 and 13 connected between terminals 14 and 15, 15 and 16, 16 and 17, respectively, and a thermistor bead 18 connected between terminals 14 and 17. Terminal 17 is returned to ground potential. When switch 21 is in the closed position, battery 20 is connected through a variable resistance 22 and a shunt resistance 23 to terminal 15 of bridge 10. When both switch 21 and switch 24 are closed, the series combination of variable resistance 25 and shunt resistance 26 is connected in parallel with the series combination of variable resistance 22 and shunt resistance 23.

Terminal 14 of bridge network 10 is connected through resistance 29 to terminal 1 of a three-position switch 27. Terminal 16 of bridge network 10 is connected to terminal 1 of a second three-position switch 28. Terminal 15 of bridge network 10 is connected to both terminals 2 and 3 of the three-position switch 28. Terminal 2 of three-position switch 27 is connected to the common connection of variable resistance 25 and shunt resistance 26. Terminal 3 of three-position switch 27 is connected to the common connection of variable resistance 22 and shunt resistance 23. Three-position switches 27 and 28 are ganged to operate together.

A meter 29 is connected between the common poles of each switch. Resistors 26 and 23 serve as shunts for the meter 29 when the switches 27 and 28 are in positions 2 and 3, respectively.

The radio frequency power to be measured is applied across terminals 30 and 31 and through condenser 32 to thermistor bead 18.

The illustrated bridge is a typical Wheatstone bridge type network containing three linear resistances of equal value and a non-linear resistance. The non-linear resistance may have either a negative or a positive coefficient of temperature. In this embodiment, the thermistor bead type, a substance including nickel, manganese and cobalt is the non-linear resistance. The thermistor bead has a negative coefficient of temperature and therefore its resistance increases in an approximately exponential fashion as the internal temperature of the resistive element of the bead decreases. The internal temperature of the bead type thermistor is controlled primarily by the electrical power dissipated in the bead from the direct voltage source applied thereto. The internal temperature and resistance of the thermistor bead is also a function of the ambient temperature and of the radio frequency (R.-F.) power dissipated in the bead.

The bridge is in an initial state of unbalance due to the fact that with no current flow in the bridge, the thermistor is of a much larger resistance value than the three linear resistances. When the radio-frequency power is impressed across the bead, the resistance of the thermistor will greatly decrease. When the direct voltage is applied to the bridge, the linear resistances increase in value to a limited extent but the thermistor will decrease in resistance to a much greater extent, because of the difference in the temperature coefficients of the non-linear and linear resistors composing the bridge. More detailed information on the properties of thermistors will be found in an article by G. L. Pearson in the Bell Laboratories Record, December 1940, page 106. The author compares different types with the resistance of platinum which has a positive temperature coefficient of small value. A uranium oxide thermistor having a specific resistance of 50,000 ohm-centimeters at 0° centigrade decreased to 2,800 ohms at 100° and to 15 ohms at 500°. A thermistor of nickel oxide and manganese oxide had a specific resistance of 10,000 ohm-centimeters at 0°, approximately 500 ohms at 100° and 0.8 ohm at 500°. Platinum, the linear resistance, had a specific resistance of $10^{-5}$ ohm-centimeters at 0° and at 500° the resistance rose only to a point midway between the specific resistance and $10^{-4}$ ohms.

After the D.-C. voltage is applied, by permitting the radio-frequency power to remain constant and by varying the D.-C. power, a point is reached where the greatly decreased thermistor resistance is equal to the slightly increased linear resistances and the bridge is balanced. At this point, the resistance of the thermistor is a function of both the R.-F. power and the D.-C. power dissipated in it. This point of balance is quite critical because of the previously mentioned difference of coefficients, and therefore very accurate power determinations are made possible. Since the variation in the resistance of the thermistor covers so large a spread as compared to the small spread in the variation of the linear resistors. a very large range in power measurements is made possible. Thereafter, the R.-F. power is removed and with the D.-C. power remaining constant, a second D.-C. power is impressed across the bridge and varied until the bridge is rebalanced. At rebalance the heating effect of the combined D.-C. power dissipated in the thermistor is equal to the heating effect produced by the dissipation of the first D.-C. power and the R.-F. power in the thermistor. Readings are taken of the magnitude of the first D.-C. current at balanced and of the second D.-C. current at rebalance. These readings are used to derive the magnitude of the R.-F. power in the manner indicated below.

Instead of a non-linear resistance having a negative coefficient of temperature, it is possible to use one having a positive coefficient. However, this arrangement is less advantageous because it would require relatively large balancing D.-C. currents which are more difficult to measure, and it would needlessly contract the range of possible measurements.

In operation, the R.-F. power to be measured is impressed across the thermistor and sufficient current from the D.-C. power source is supplied to bring the thermistor bead to the correct internal temperature and resistance in order to balance the bridge. Such a balanced condition is indicated by zero current flowing through the meter 29 in the output loop of the bridge. Then the radio frequency power is removed and sufficient current from the same power source is supplied through a different path to rebalance the bridge. The currents associated with the two operations above are measured and an indication of R.-F. power is derived in the following manner:

With R.-F. power being applied to the thermistor bead, switch 21 closed, switch 24 open, and each of switches 27 and 28 set to position 1, meter 29 is adjusted to zero by varying the variable resistor 22. The power P dissipated in the thermistor bead 18 (in watts) is given by the equation:

$$P = P_{rf} + \left(\frac{I}{2}\right)^2 R \quad (1)$$

where, $P_{rf}$ is the R.-F. power (in watts) dissipated in the thermistor bead 18.

R is the resistance of the thermistor bead at balance, and

I is the current flowing through fixed resistor 23 as measured by meter 29 when switches 27 and 28 are in position 3.

The factor $$\frac{I}{2}$$

represents the current flowing through the thermistor bead 18 at balance, since, assuming that all fixed resistances of the bridge are of equal value, only one-half of the total current entering the bridge actually flows through the thermistor bead.

As the second step in the measurement, the R.-F. power is removed, switch 24 is closed, and the meter 29 is rebalanced by means of variable resistance 25. If the ambient temperature has not changed, the power $P_1$ (in watts) now dissipated in the thermistor bead 18 is equal to:

$$P_1 = \left(\frac{I + I_1}{2}\right)^2 R \quad (2)$$

where, $I_1$ is the current flowing through fixed resistor 26 as measured by meter 29 when switches 27 and 28 are in position 2, and current I and the resistance R have the same significance as in Equation 1.

At bridge balance the power P is equal to the power $P_1$. Therefore, the value of the R.-F. power $P_{rf}$ (in watts) is obtained from the relation:

$$P_{rf} = II_1\frac{R}{2} + I_1^2\frac{R}{4} \quad (3)$$

To simplify Equation 3, the R.-F. power, $P_{rf}$ (in watts), is given approximately by the relation:

$$P_{rf} = II_1\frac{R}{2} \text{ since } II_1 \gg I_1^2 \quad (4)$$

The range of power can be made adjustable by including several values of the shunt resistors 23 and 26 on a rotary switch.

Relatively low-resistance bridge arms and a low-resistance meter are essential for good sensitivity. Sensitivity is improved by using a low-impedance direct-voltage supply. For measuring R.-F. power, particular attention must be paid to matching the impedance of the thermistor bead to the R.-F. transmission line used.

The thermistor bead described in this invention is useful in measuring R.-F. power when the equipment is, of necessity, required to be compact and portable.

While there has been described what is at present considered to be the preferred embodiment of this invention, it will be obvious to those skilled in the art that various changes and modifications may be made therein without departing from the scope of the invention.

What is claimed is:

1. In combination, a bridge network including three constant resistors and a temperature-sensitive resistive element, means for applying an electrical power input to said temperature-sensitive resistive element, first and second means for separately producing first and second direct-current flows through said bridge, meter means for indicating each of said first and second currents individually and also the direct-current output of the bridge, and means for adjusting the respective values of said first and second direct-current flows to balance said bridge.

2. In a bridge network containing a non-linear resistance element, means for impressing an A.-C. power input across said element, first and second means for separately producing first and second direct-current flows in said bridge network, meter means for indicating said first and second direct-current flows individually and also the output of said bridge, and means for adjusting said first and second direct-current flows to balance said bridge whereby the magnitude of said A.-C. power is determined.

THEODORE S. SAAD.

REFERENCES CITED

The following references are of record in the file of this patent:

UNITED STATES PATENTS

| Number | Name | Date |
| --- | --- | --- |
| 1,407,147 | Goodwin | Feb. 21, 1922 |
| 1,590,420 | Chubb | June 29, 1926 |
| 2,278,686 | Brown et al. | Apr. 7, 1942 |
| 2,278,687 | Brown | Apr. 7, 1942 |
| 2,399,481 | George | Apr. 30, 1946 |
| 2,415,823 | Houghton | Feb. 18, 1947 |
| 2,417,820 | Ginzton | Mar. 25, 1947 |